United States Patent
Krishnamoorthy et al.

(10) Patent No.: US 6,636,500 B2
(45) Date of Patent: Oct. 21, 2003

(54) MEDIUM ALLOCATION METHOD

(75) Inventors: Rajeev Krishnamoorthy, Middletown, NJ (US); Shankar Narayanaswamy, Sunnyvale, CA (US); Markus Rupp, Lincroft, NJ (US); Harish Viswanathan, Matawan, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/362,002

(22) Filed: Jul. 27, 1999

(65) Prior Publication Data
US 2002/0051424 A1 May 2, 2002

(51) Int. Cl.$^7$ .............................................. H04B 7/222
(52) U.S. Cl. ...................................... 370/347; 370/468
(58) Field of Search ................................ 370/347, 465, 370/468, 477, 329, 333, 336, 337; 455/450, 451, 452, 453; 375/261, 264, 298

(56) References Cited

U.S. PATENT DOCUMENTS

| | | | | |
|---|---|---|---|---|
| 5,490,136 A | * | 2/1996 | Sereno et al. | 370/468 |
| 5,533,004 A | * | 7/1996 | Jasper et al. | 370/465 |
| 5,577,087 A | * | 11/1996 | Furuya | 375/377 |
| 5,701,294 A | | 12/1997 | Ward et al. | 370/252 |
| 5,745,480 A | * | 4/1998 | Behtash et al. | 370/468 |
| 5,764,699 A | * | 6/1998 | Needham et al. | 375/298 |
| 5,828,695 A | * | 10/1998 | Webb | 375/219 |
| 5,909,469 A | | 6/1999 | Frodigh et al. | 375/302 |
| 6,167,031 A | * | 12/2000 | Olofsson et al. | 370/252 |
| 6,212,240 B1 | | 4/2001 | Scheibel et al. | 370/468 |
| 6,359,934 B1 | * | 3/2002 | Yoshida | 370/234 |
| 6,407,993 B1 | * | 6/2002 | Moulsley | 370/347 |

FOREIGN PATENT DOCUMENTS

EP 0 507 384 A 3/1992 ............ H04B/7/26

OTHER PUBLICATIONS

Goldsmith et al, Variable–Rate Variable–Power MQAM for Fading Channels, IEEE, pp. 1218–1230, 1997.*
Otsuki et al, Modulation Level Controlled Adaptive Modulation Systems with Based–Station–Based Transmission/Reception Diversity Scheme for Personal Communications, IEEE, pp. 1537–1541, 1995.*
European Patent Office Search Report, Application No. 98 30 9952, The Hague, Aug. 14, 2000.
Takehiro Ikeda, et al., "TDMA–Based Adaptive Modulation with Dynamic Channel Assignment (AMDCA) for High Capacity Multi–media Microcellular Systems", *IEEE Vehicular Technology Conference*, May 4, 1997, pp. 1479–1483.
European Search Report for European Patent Application No. 00306044.9–2209, dated Oct. 12, 2000 (4 pages).

* cited by examiner

*Primary Examiner*—Seema S. Rao
*Assistant Examiner*—Frank Duong
(74) *Attorney, Agent, or Firm*—Eugene J. Rosenthal

(57) ABSTRACT

In a system in which the modulation scheme employed may change on a per-time-slot basis, a user's available data rate may change even if the user maintains the same number of time slots, because the capacity of the user's time slots may change. If one or more such changes in modulation scheme occurs, the data rate available to the user may no longer match his current data rate needs. Therefore, a method is disclosed for determining the number of time slots to assign to a user as a function of the user's current data rate requirement and the actual current cumulative data rate of the time slots currently assigned to the user. The user data rate requirement may further be a function of a quality of service (QoS) contracted for by the user. Thus, the assignment of the time slots within the frame is made dynamically and the number of time slots employed by a user is increased or decreased according to the user's current data rate requirements and the ability of the time slots already assigned to the user to meet those requirements.

18 Claims, 3 Drawing Sheets

MEDIUM ALLOCATION METHOD

TECHNICAL FIELD

This invention relates to the art of allocating available data rate to users of a wireless communication system and in particular, to allocating available data rate to users of fixed wireless loop, or so-called "wireless local loop" systems.

BACKGROUND OF THE INVENTION

Typical prior art wireless systems employ a fixed data rate allocation per user. Once a user is assigned a modulation scheme, i.e., a constellation for mapping the user's bits into symbols, the user's data rate is fixed unless the user is assigned further, e.g., an additional one or more, time slots. Such systems a) maintain a fixed data rate for the user at all times provided the user is assigned no additional time slots nor loses any already assigned ones, and b) are unable to take advantage of improvements in channel quality, and suffer in the event of channel quality degradation.

SUMMARY OF THE INVENTION

We have recognized that in a system in which the modulation scheme employed may change on a per-time-slot basis, i.e., from time slot to time slot, so that the constellation used to encode the symbols of each time slot may be different for each time slot within a single frame and may be different for a particular time slot in different consecutive frames, then a user's available data rate may change even if the user maintains the same number of time slots per frame, because the capacity of the user's time slots may change. If one or more such changes in modulation scheme occurs, the data rate available to the user may no longer match his current data rate needs. Therefore, in accordance with the principle of the invention, we have developed a method for determining the number of time slots to assign to a user as a function of the user's current data rate requirement and the actual current cumulative data rate of the time slots currently assigned to the user. The user data rate requirement may further be a function of a quality of service (QoS) contracted for by the user.

In particular, several modulation schemes are available, but the ability to use any particular one of them is determined by the current channel quality. Each modulation scheme provides the ability to transmit a different number of bits per symbol within a time slot, and, in accordance with an aspect of the invention, the modulation scheme employed may be changed on a per-time-slot basis. As a result, the actual available user data rate for the time slots already assigned to the user may be rapidly changing. To compensate for this, the assignment of the time slots within the frame is made dynamically and the number of time slots employed by a user is increased or decreased according to the user's current data rate requirements and the ability of the time slots already assigned to the user to meet those requirements.

DETAILED DESCRIPTION

Figure 1:
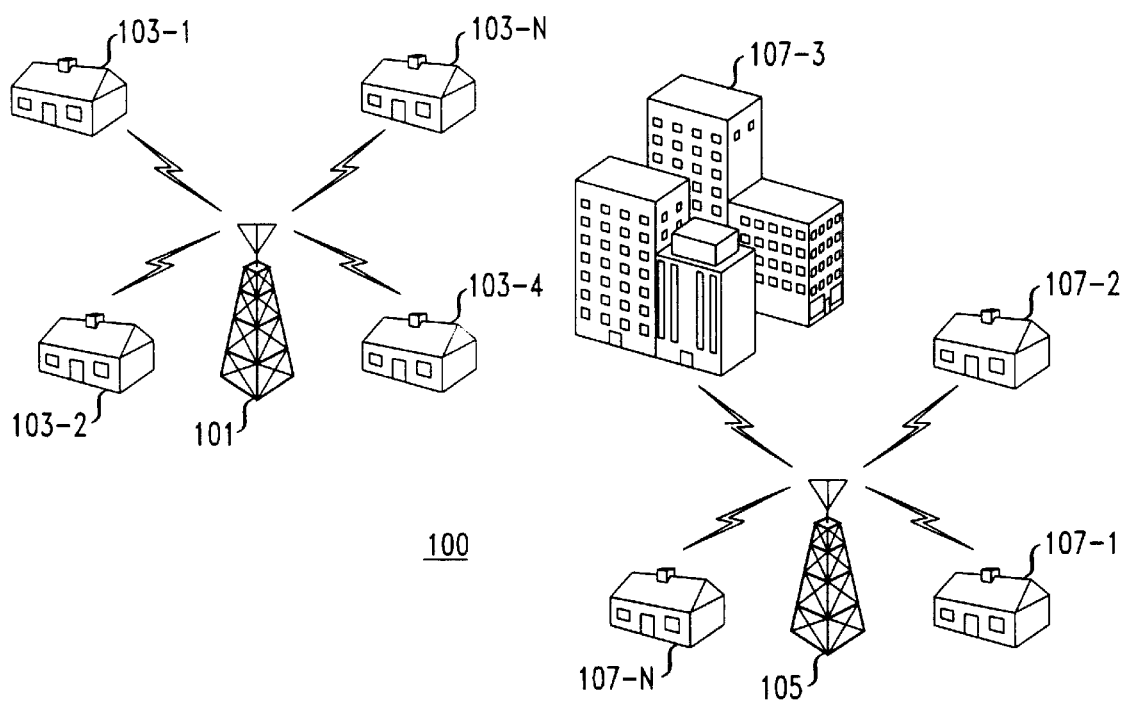
FIG. 1 shows exemplary steerable beam TDMA wireless communication system arranged in accordance with the principles of the invention.

The following merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGs., including functional blocks labeled as "processors" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

Note that as used herein channel quality includes effects from channel properties, such as multipath; interference from other sources, such as other radio sources of the same or other systems as well as cosmic sources; and noise, such as thermal noise within the receiver itself.

FIG. 1 shows exemplary steerable beam TDMA wireless communication system 100 arranged in accordance with the principles of the invention. Wireless communication system 100 includes base station antenna 101 serving remote terminals 103-1 through 103-N, collectively remote terminals 103, and base station antenna 105 serving remote terminals 107-1 through 107-N, collectively remote terminals 107. The pairing of a remote terminal with a particular base station is determined by the implementor based on the best signal power and least interference that can be achieved for a remote terminal-base station pair.

In steerable beam wireless communication system 100, the beam pattern formed at the remote terminal location may be of any arbitrary width. The particular width of the beam is a function of the directionality of the antenna design and often it is a wide beam. Typically the same beam pattern is used for both transmitting and receiving. For example, an antenna at the remote terminal location having a 30° angle has been employed in one embodiment of the invention, although any other angle may be used.

The base station has the ability to controllably form beam patterns of substantially arbitrary width, so as to listen and transmit on either a wide beam or on a narrow beam, depending on the situation. Initially, e.g., during call setup, communication between a base station and a remote terminal is carried out by having the base station use a wide beam. However, once a communication channel is established between a base station and a remote terminal, i.e., a so-called "traffic" channel, the base station typically uses a narrow beam. When using a narrow beam, the base station directs the beam in the direction of the remote terminal at the time communication is to take place between the base station and the remote terminal. Communication may be simultaneously bidirectional between the base station and the remote terminal, e.g., one frequency is used for transmission from the base station to the remote terminal while a second frequency is used for transmission from the remote terminal to the base station.

Figure 2:
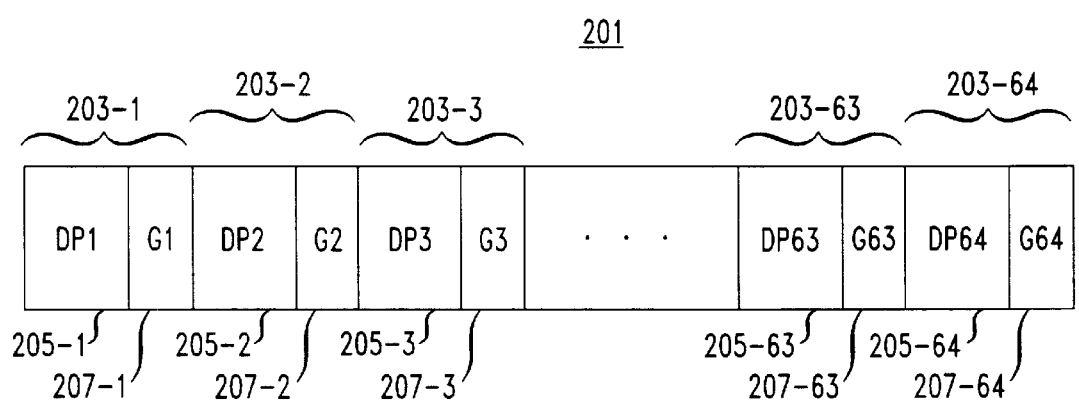
FIG. 2 shows an exemplary frame structure for use in the steerable beam wireless communication system of FIG. 1.

Steerable beam wireless communication system 100 of FIG. 1 is a time division multiple access (TDMA) system. Such systems employ a repeating frame structure, within each frame there being time slots. FIG. 2 shows an exemplary frame structure 201 for use in steerable beam wireless communication system 100. Frame structure 201 is 2.5 ms long and contains within it 64 time slots 203, including time slots 203-1 through 203-64. Each of time slots 203 includes a data part (DP) 205 and a guard interval (G) part 207. For example, each of time slots 203 is 2.5/64 ms, which is 39.0625 $\mu$s. Each guard interval 207 is 2 $\mu$s leaving each data part 205 as being 37.0625 $\mu$s. The same frame structure is used for both the uplink, i.e., from the remote terminal to the base station, and for the downlink, i.e., from the base station to the remote terminal.

More specifically, each time slot 203 is divided into symbols, the number of which is determined by the implementor based on bandwidth and the time slot period. For example, as noted above, a 39.0625 $\mu$s time slot period with a guard interval of 2 $\mu$s leaves a data part of 37.0625 $\mu$s. If the channel bandwidth is 5 MHz, and the useful bandwidth 3.9936 MHz, then there are 148 symbols, each of length approximately 250.04 ns.

The number of bits per symbol, i.e., the constellation size, determines the number of bits that are transmitted in each time slot. In accordance with an aspect of the invention, the number of bits per symbol may be changed on a per-time slot basis regardless of the position of the data that is to be placed in time slot within the data stream of the user, i.e., regardless of the state of the segmentation algorithm which is dividing the user data into radio link packets for transmission in time slot-sized units. For example, in one embodiment of the invention, five different modulation schemes are employed, namely, a) quadrature phase shift keying (QPSK), b) 8-ary phase shift keying (8-PSK), c) 16 quadrature amplitude modulation (16-QAM), d) 32 quadrature amplitude modulation (32-QAM), d) 64 quadrature amplitude modulation (64-QAM). For a time slot with 148 symbols, these modulation schemes enable the transmission therein of a) 296, b) 444, c) 592, d) 740, and e) 888 raw bits, respecitively. Note that the actual bits available for user data in a time slot will often be less than the number of raw bits due to the use of raw bits for training sequences, headers, error detection and/or correction codes, and the like.

In accordance with the principles of the invention, a) the number of bits per symbol, i.e., the constellation size which is used in the mapping of a user's data for transmission, and b) the number of time slots allocated to a user per frame, are determined as a function of the channel quality and the user requirement for data rate at a specified quality of service (QoS), if any. In accordance with an aspect of the invention, the modulation scheme employed may be changed on a per time slot basis. The assignment of time slots within the frame to various users is made dynamically. Advantageously, by changing the modulation scheme employed per time slot and the number of time slots employed by a user the user's data rate may be rapidly changed, i.e., increased or decreased, according to the user's requirements.

Note that a "user" as referred to herein may be reflective of a particular person, a particular terminal, or particular applications or instantiations thereof, depending on the implementor. Those of ordinary skill in the art will readily be able to design from the description herein systems that accommodate any of these meanings for the "user", and even for any combination of such meanings.

Figure 3:
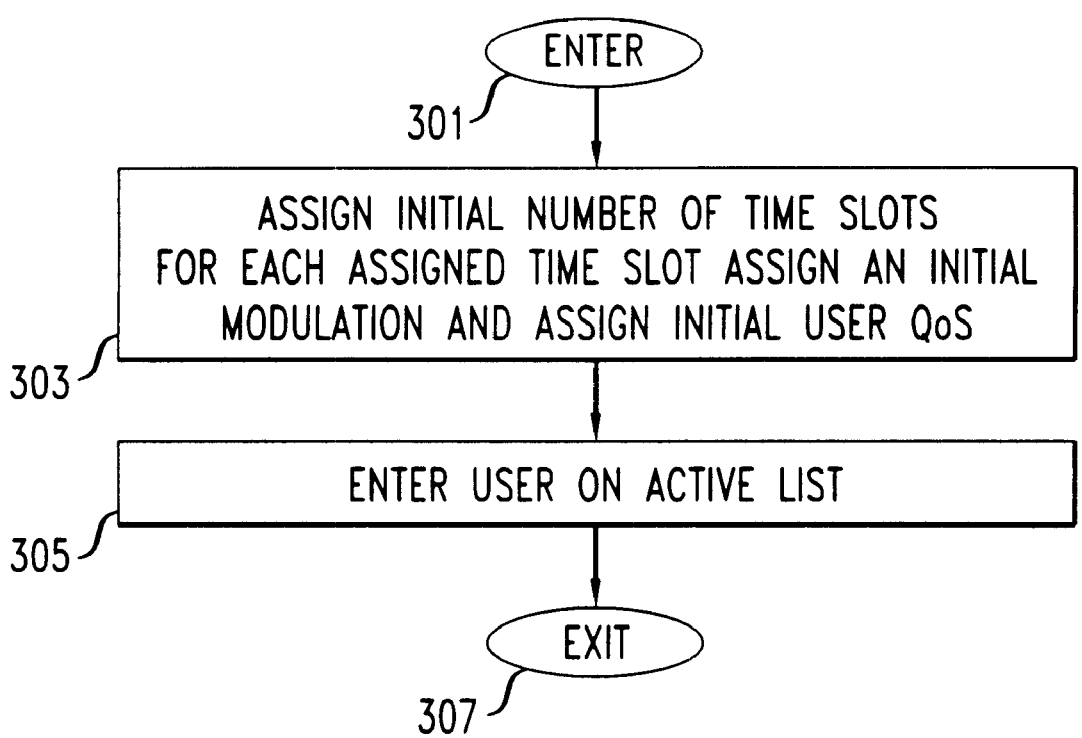
FIG. 3 shows an exemplary initialization process which is performed when a user becomes active and requests user traffic service or when the user needs to receive incoming traffic, e.g., an incoming call.

FIG. 3 shows an exemplary initialization process which is performed when a user becomes active and requests user traffic service or when the user needs to receive incoming traffic, e.g., an incoming call. The process is entered in step 301 when a condition for the user to receive service occurs. Such a condition may be the user deciding to originate a voice telephone call, the user opening a data communication based application, the user opening a new instantiation of an already open data communications application, the user receiving an incoming voice call, the user receiving an incoming data communication, or the like.

Next, in step 303, an initial number of time slots is assigned for use by the user. The number of time slots initially assigned may be a prescribed default number, may be a function of anticipated initial data rate given historical use by the user, may be a data rate based on the type of service that is requested, or the like. Also, in step 303 an initial modulation scheme is assigned for each time slot assigned for use by the user. The initial modulation scheme assigned may be a default one, e.g., the lowest most cautious modulation scheme, or may be based on historical information as to a modulation scheme that is usually successful for this user. Lastly, in step 303, an optional initial quality of service (QoS) is assigned for the user. The QoS assigned may be a default QoS or may be based on the type of service that is requested, or the like.

Next, in step 305, the user is entered into the list of active users, so that it will be recognized to be provided with service by other processes. The process then exits in step 307.

Figure 4:
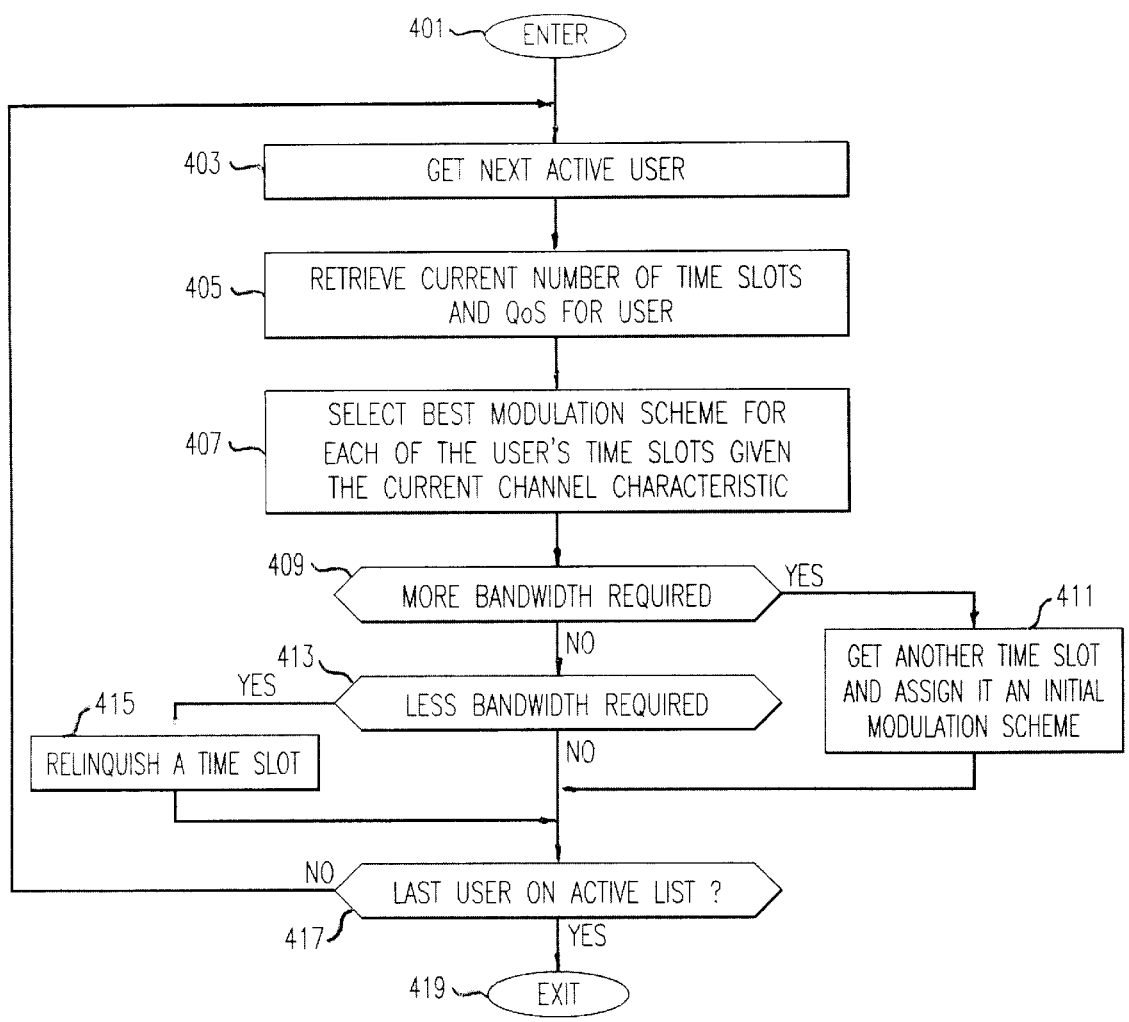
FIG. 4 shows an exemplary process for assigning number of time slots, and modulation schemes for those time slots given a required data rate and QoS, in accordance with the principles of the invention.

FIG. 4 shows an exemplary process for assigning number of time slots, and modulation schemes for those time slots given a required data rate and QoS, in accordance with the principles of the invention. The process is entered periodically via step 401. The periodicity is a function of the coherence time of the channel, i.e., the rate at which the channel properties change, which may be readily determined by the implementor using conventional techniques. For example, in fixed wireless system, the process was executed approximately every tenth of a second.

Next, in step 403, the next user on the active list is identified. Thereafter, in step 405, the current number of time slots presently being used by that user and the QoS for that user is retrieved. In step 407, a modulation scheme is selected for each time slot employed by the user. Since the modulation scheme that may be employed for any channel is a function of the channel quality, which may change over time, it is necessary to monitor the channel quality in order to determine the modulation scheme that can be employed. Typically, the modulation scheme selected is the one having the highest bit/symbol ratio that can be achieved which satisfies the QoS requirements given the current channel characteristics. However, one significant exception to this rule may be when the service of the user is a constant bit-rate service, such as voice communication. In such a case the modulation scheme selected is one that minimizes the error rate and meets the bit-rate requirement of the service.

Conditional branch point 409 evaluates the bit rate that is available given the current number of time slots assigned for the user and the modulation scheme of each of those time slots and tests to determine if additional data rate is required to meet the users required bit-rate. If the test result in step 409 is YES, control passes to step 411, in which another time slot is obtained and assigned to the user. Also, in step 411, an initial modulation scheme is assigned to the time slot that was just assigned to the user. The selection of the initial modulation scheme in step 411 is performed similar to the selection of the initial modulation scheme in step 303 (FIG. 3).

If the test result in step 409 is NO, control passes to conditional branch point 413 which tests to determine if less data rate than that currently available given the number of time slots assigned to the user and the modulation scheme of each is required by the user. If the test result in step in step 413 is YES, control passes to step 415, in which one of the user's time slots is relinquished. In one embodiment of the invention, the time slot with the worst modulation scheme, i.e., the time slot capable of carrying the least data rate for the user from those that are carrying its data, is the one that is relinquished.

If the test result in step 413 is NO, indicating that the user's required data rate and the data rate currently available to the user substantially match, or after completion of steps 411 or 415, control passes to conditional branch point 417 which tests to determine if the current user is the last user on the active user list. If the test result in step 417 is NO, indicating that there are additional users that remain to be processed, control passes back to step 403 to process the next active user. If the test result in step 417 in YES, indicating the current user is the last user on the active list, control passes to step 419 and the process exits.

The matching receiver is notified as to which time slots are assigned to the user in the usual manner.

Note that there is no reason to limit the number of time slots that may be added or relinquished for a user to one for each execution of the process of FIG. 4. Instead, as will be readily apparent to these of ordinary skill in the art, more than one time slot may be added or relinquished until the target data rate is met.

The estimating of whether more, less, or the same data rate is required by a user may be performed by monitoring the user's input and output buffers.

In one embodiment of the invention the user may contract for a particular quality of sevice (QoS). Exemplary factors that may be specified as determining the quality of service are a) the error rate; b) the latency, such as the maximum, or the variance thereof; and c) the data rate, e.g., a minimum required data rate or a maximum allowable data rate. The particular QoS contracted for, if any, is considered in steps 409 and 413 so as to determine whether to increase or decrease the number of time slots assigned to the user.

Note that as used herein, within the rubric of the term "frame structure" is included the idea that is sometimes referred to as a superframe, i.e., the frame is defined as being bounded by a known regularly repeating time slot, although other smaller frames may be included therein.

In accordance with another aspect of the invention, a base station may employ a sectorized antenna, and furthermore, it may employ multiple beams per sector. If multiple radio beams are employed, each radio beam may transmit its own independent frame. Advantageously, in accordance with an aspect of the invention, the time slots that are employed for a user within a single time frame period need not all be transmitted by the same radio beam. In other words, such time slots may appear within the different frames that are transmitted by the various radio beams. Although a remote station may only receive on a single beam for the duration of any one time slot, it may receive data from different ones of the beams in different ones of the time slots during a single frame period. The only requirement is that the time slots must be nonoverlapping in time to prevent a collision from occurring and the data from being corrupted. It is therefore necessary to coordinate the assignment of time slots for transmission via each of the beams to achieve the user's required data rate.

What is claimed is:

1. A method for use in wireless transmission in a system that has available to it a plurality of data modulation schemes, each said scheme mapping a different number of bits per symbol, the method comprising the steps of:

determining a new data rate requirement for a user; and assigning time slots within a frame to match said user's data rate requirement;

wherein, said assigning step further comprises the steps of analyzing a current data rate for said user by determining a data rate capable of being carried by each time slot currently assigned to said user given a current modulation scheme therefor; and altering the number of time slots assigned to said user when necessary to insure that the combined data rate of the time slots assigned to said user matches said user's new data rate requirement;

the method being CHARACTERIZED in that said current modulation scheme is determined independently for each time slot assigned to said user within said frame, and being further CHARACTERIZED in that said assigning step assigns at least a first and second time slot to said user within said frame, each of said first and second time slot having had a modulation scheme determined for it, said determined and assigned modulation scheme for said first time slot being different from said determined and assigned modulation scheme for said second time slot.

2. The invention as defined in claim 1 wherein said altering step includes the step of assigning at least one more time slot to said user than was already assigned to said user.

3. The invention as defined in claim 1 wherein said altering step includes the step of assigning at least one less time slot to said user than was already assigned to said user.

4. The invention as defined in claim 1 wherein said altering step includes the step of determining an initial modulation scheme and corresponding data rate for each time slot to be additionally assigned to said user.

5. The invention as defined in claim 1 wherein, in said altering step, at least one less time slot is assigned to said user than was already assigned to said user, said particular time slot no longer being assigned to said user being a time slot having a lowest data rate for said user.

6. The invention as defined in claim 1 wherein said new data rate requirement for said user is relative to a current data rate requirement.

7. The invention as defined in claim 1 wherein said user further has a required quality of service, and wherein said assigning step is also a function of said required quality of service.

8. The invention as defined in claim 1 wherein said modulation scheme is determined for each time slot.

9. The invention as defined in claim 1 further including the step of notifying a receiver which time slots are assigned to said user.

10. A method for use in wireless transmission in a system that has available to it a plurality of data modulation schemes, each said scheme mapping a different number of bits per symbol, the method, comprising the steps of:

assigning one or more time slots within a frame for use by a user; and selecting a modulation scheme from said plurality of modulation schemes for use in mapping user data bits to symbols to be transmitted in each of said assigned time slots;

wherein said assigning and selecting steps are coordinated to achieve a prescribed user data rate given a current channel quality;

wherein said selecting step is performed so that said modulation scheme is independently selected for each of said assigned time slots within said frame, and wherein said assigning step assigns at least a first and second time slot for use by said user within said frame, said first time slot having a modulation scheme selected for it in said selecting step that is different from the modulation scheme selected in said selecting step for said second time slot.

11. The invention as defined in claim 10 wherein said selecting step is a function of a channel quality that is determined for each time slot.

12. A method for use in wireless transmission in a system that has available to it a plurality of data modulation schemes, each said scheme mapping a different number of bits per symbol and being independently assignable on a per-time slot basis, the method comprising the step of assigning a plurality of time slots within a frame for use by a user as a function of a channel quality and said user data rate requirement, at least two of said plurality of time slots within said frame having been assigned a different data modulation scheme.

13. The invention as defined in claim 12 wherein said channel quality is used as a basis to select a modulation scheme from said plurality of modulation schemes for use in mapping user data bits to symbols to be transmitted in each of said assigned time slots.

14. A method for use in wireless transmission in a system that has available to it a plurality of data constellation mapping schemes, each said scheme mapping a different number of bits per symbol, the method, comprising the steps of:

determining a user data rate requirement;

assigning time slots within a frame to match said user data rate requirement;

wherein, said assigning step further comprises the steps of:

analyzing a current user data rate by determining a data rate for each time slot within said frame that is currently assigned to said user given a current constellation mapping scheme therefor; and changing the number of time slots within said frame assigned to said user so that after performing said changing the combined data rate of the time slots thereafter assigned to said user within said frame more closely matches said user data rate requirement than said current user data rate did;

wherein said assigning step assigns at least a first and second time slot within said frame for use by said user, said first time slot having a current constellation mapping scheme that is different from the constellation mapping scheme for said second time slot.

15. The invention as defined in claim 14 wherein said user further has a required quality of service, and wherein said assigning step is also a function of said required quality of service.

16. Apparatus for use in wireless transmission in a system that has available to it a plurality of data modulation schemes, each said scheme mapping a different number of bits per symbol, said apparatus comprising:

means for determining a new user data rate requirement; and means for assigning time slots within a frame to match said user data rate requirement;

wherein, said means for assigning further comprises means for analyzing a current user data rate by determining a data rate capable of being carried by each time slot currently assigned within said frame to said user given a current modulation scheme therefor; and means for altering the number of time slots assigned to said user within said frame when necessary to insure that the combined data rate of the time slots assigned to said user within said frame matches said new user data rate requirement;

said apparatus being CHARACTERIZED in that said current modulation scheme is determined independently for each time slot assigned to said user within said frame, and being further CHARACTERIZED in that said means for assigning is adapted to assign at least a first and second time slot within said frame to said user each of which is assigned a respective different modulation scheme.

17. Apparatus for use in wireless transmission in a system that has available to it a plurality of data modulation schemes, each said scheme mapping a different number of bits per symbol, said apparatus comprising:

a user data rate requirement determiner; and a time slot assigner that assigns time slots to users within a frame as a function of the modulation scheme that can be achieved for each said time slot so that a total data rate assigned to each user substantially matches that users data rate requirement;

wherein said time slot assigner is adapted to assign at least a first and second time slot within said frame to said user which each employ a respective different modulation scheme.

18. Software for use in wireless transmission in a system that has available to it a plurality of data modulation schemes, each said scheme mapping a different number of bits per symbol, said software being in computer readable form, said software being for causing a processor to perform functions comprising:

determining a new user data rate requirement; and altering a current assignment of time slots within a frame so as to better match an accumulated data rate of all channels assigned to said user to said user data rate requirement than said current assignment of time slots matches said user data rate requirement, said assigning being a function of a maximum data rate achievable for each time slot assignable to said user within said frame by employing a one of said modulation schemes employable for said time slot;

said software being CHARACTERIZED in that said current modulation scheme is determined independently for each time slot assigned to said user within said frame, and being further CHARACTERIZED in that said altering step alters said current assignment within said frame so that at least a first and second time slot of said user are each assigned a respective different one of said modulation schemes.

* * * * *